United States Patent [19]
Holzman

[11] 3,778,015
[45] Dec. 11, 1973

[54] METHOD AND APPARATUS FOR THE MOUNTING OF VEHICLE-MIRROR ASSEMBLIES

[75] Inventor: James W. Holzman, Haycock Twp., Bucks County, Pa.

[73] Assignee: Delbar Products, Inc., Perkasie, Pa.

[22] Filed: July 17, 1972

[21] Appl. No.: 272,123

[52] U.S. Cl. .......................... 248/475 R, 287/20 R
[51] Int. Cl. ............................................. B60r 1/06
[58] Field of Search ................ 248/475 R, 476, 478, 248/479, 480, 484, 486, 487; 287/20 R; 85/50 R; 350/307

[56] References Cited
UNITED STATES PATENTS

| | | | |
|---|---|---|---|
| 2,803,733 | 8/1957 | Kashirsky | 248/480 X |
| 3,220,289 | 11/1965 | Farekas | 85/50 R X |
| 2,120,462 | 6/1938 | Ferguson | 85/50 R X |
| 3,667,718 | 6/1972 | Goslin et al | 248/487 |
| 3,384,334 | 5/1968 | Malachowski | 248/487 X |
| 2,827,255 | 3/1958 | Kampa | 248/480 |

Primary Examiner—J. Franklin Foss
Attorney—Dexter N. Shaw et al.

[57] ABSTRACT

A vehicle-mirror is mounted to the exterior of a vehicle body by providing on each selected mounting area of the vehicle body an adapter member presenting a cylindrical surface against which a corresponding cylindrical surface of a mirror-supporting articulating member is positioned in angularly adjustable mating relation. The adapter member and the articulating member are secured to each other and to the vehicle body by a fastener, such as a self-tapping screw, extending through a slot in one member and a bore in the other member; a pilot hole may be made in the vehicle body for the fastener by applying a drill through the slot and bore combination with the articulating member and the adapter member in their selected mating positions. In this way a secure flush mounting is obtained for any of a variety of contours of vehicle surfaces.

10 Claims, 6 Drawing Figures

PATENTED DEC 11 1973 3,778,015
FIG.1
FIG.2
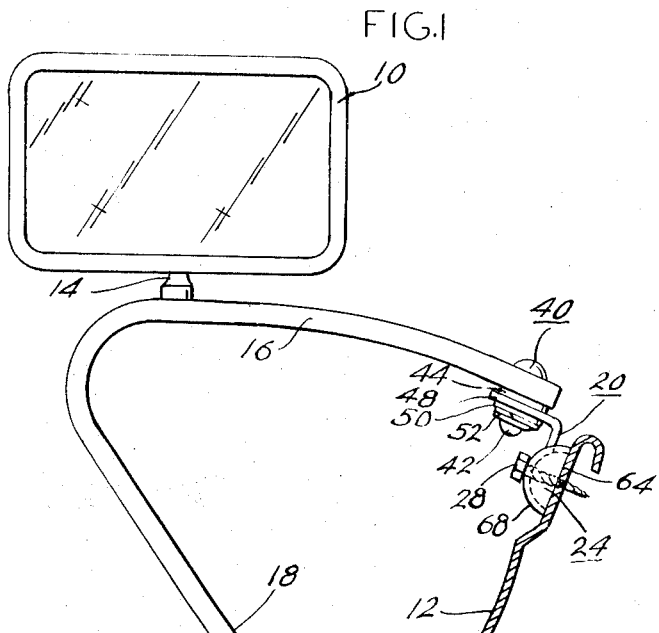
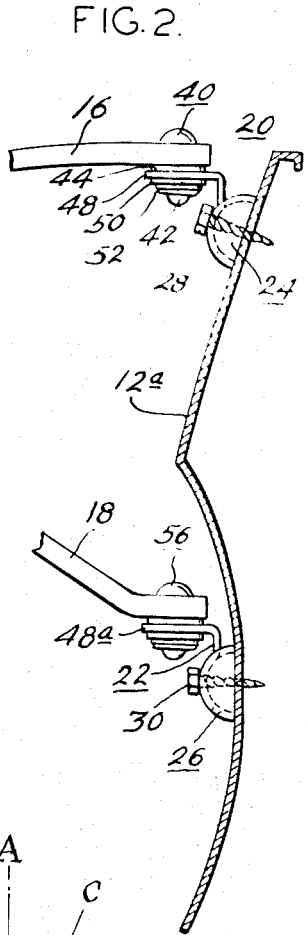
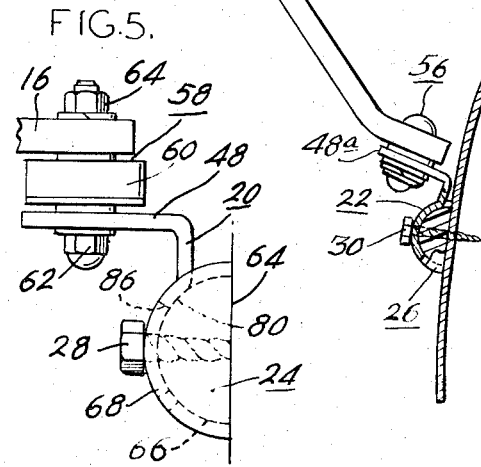
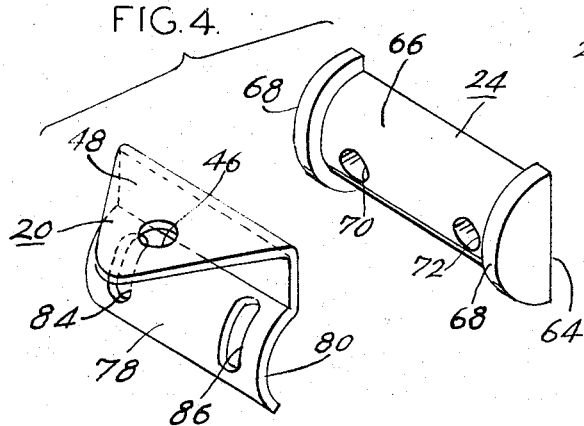
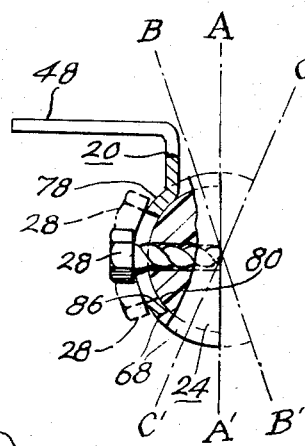
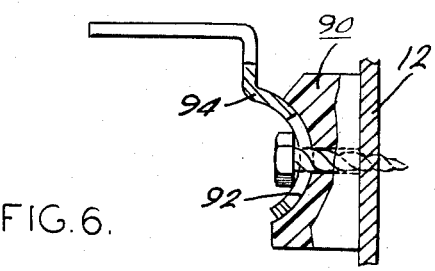
FIG.5.
FIG.4.
FIG.3.
FIG.6.

METHOD AND APPARATUS FOR THE MOUNTING OF VEHICLE-MIRROR ASSEMBLIES

BACKGROUND OF THE INVENTION

This invention relates to apparatus and method for the mounting of a vehicle-mirror assembly to a vehicle, and particularly to such method and apparatus for mounting rear-view vehicle mirror assemblies on the outer surfaces of trucks and automobiles of differing external contours.

Particularly in the case of trucks, trailer-pulling automobiles, mobile homes or the like, it is common to mount the rear-view mirror or mirrors on the outside of the vehicle body, typically on the exterior of one or both of the front doors. Such a mounting of the mirrors is in fact generally required, because the view from a mirror mounted internally of the vehicle will normally be blocked. In order to obtain an adequate angle of view, the mirror is usually quite large and mounted outwardly from the sides of the vehicle by a substantial distance.

In a typical arrangement, the mirror is mounted on a ball joint so it can be turned and adjusted to any desired angle, and the ball joint in turn is mounted on support means secured to the exterior of the vehicle body and extending outward therefrom. Typically the support means comprises two or more support arms secured to different areas of the exterior of the vehicle body, and in some cases a pivot and self-locking hinge joint are included so that the entire mirror assembly can be manually swung from an extended to a retracted position against the side of the vehicle body to reduce the overall width of the vehicle plus its one or more mirror assemblies.

A difficulty arises in connection with the mounting of such mirror assemblies to the exteriors of vehicles due to differences between the external contours of different vehicles. If the exterior contours of all vehicles were identical, then the support arms of the mirror assemblies could be provided with standard appropriately-shaped mounting feet for seating properly upon the areas of the vehicle bodies to which they are to be secured. However, not only will different vehicles, in general, have mounting areas making different angles with the vertical, but the areas of attachment on one vehicle may have different horizontal displacements from each other compared to the attachment areas on another vehicle, as will be described more fully hereinafter. Accordingly, if a given mirror support assembly is moved into the generally desired position with the fixed ends of its support arms bearing against the vehicle body, these ends in general will not provide the type of flush engagement with the vehicle body which is desired for the most secure mounting.

In accordance with the prior art, it would be possible to provide an angularly adjustable connector at the end of each support arm, which connector could be turned to fit flush against the mounting surface on the vehicle and then fixed in angular position. For example, a ball joint can be used to permit angular adjustment of such a mounting connector, which ball joint can be fixed rigidly in angular position after the mounting is completed; or a horizontal pivot pin can be provided for mounting the connector so that it can be oriented about a generally horizontal axis to provide flush contact with the mounting surface and then be fixed in angular position. However, the manufacture of such ball joint or pivot mounting arrangements and their installation on a vehicle involve considerable expense, inconvenience and time.

Accordingly, it is an object of the invention to provide new and improved method and apparatus for the mounting of vehicle mirror assemblies to a vehicle.

A further object is to provide such method and apparatus which may be used to mount such assemblies securely to any of a variety of vehicles having substantially different body contours in the mounting areas.

A further object is to provide such apparatus and method which are simple, inexpensive, and easy to use.

SUMMARY OF THE INVENTION

In accordance with the invention, mounting means are provided for a vehicle mirror assembly, comprising mounting adapter means one side of which is adapted to bear against the vehicle body and the opposite side of which is provided with a first cylindrical surface. An articulating member is also provided which is adapted to support a mirror assembly and which comprises a second cylindrical surface mating with said first cylindrical surface and having a common cylindrical axis therewith whereby the articulating member is angularly adjustable to various angular positions of mating with respect to the mounting adapter means, about their common axis. Fastening means are also employed for securing the mounting adapter means to the vehicle body in a desired mounting position and for securing the articulating member to the mounting adapter means in a selected angular position with respect thereto. The fastening means preferably comprises a fastening member extending through the articulating member and through the adapter means into the vehicle body, and in a preferred embodiment is a self-tapping screw.

To facilitate assembly, the mounting adapter means is preferably provided with at least one bore extending through the cylindrical surface thereof and the articulating member is provided with at least one slot at right angles to its cylindrical surface and in alignment with the outer end of the corresponding bore, whereby one or more fasteners may be inserted through the one or more slots and bores into the vehicle body. In a preferred embodiment the mounting adapter means also comprises flange means spaced apart to receive and axially position the articulating member between the flange means. Further, in preferred embodiments of the invention the mounting means described above are provided at the ends of each of a plurality of support members for supporting a mirror.

According to the method of the invention, an adapter member is placed on each of the mounting areas of the vehicle, and the mirror support structure moved into a position for which each of the cylindrical surfaces of the articulating members mates with the corresponding cylindrical surface of its associated adapter member. The adapter and the articulating member are initially free to assume any relative angular position within a predetermined range and still maintain their mating contact. Accordingly, even though the adapter member may be oriented in any of a variety of different directions because of differences in contour of different vehicle bodies, nevertheless the articulating member will be in flush mating relation with the adapter and provide the desired stable support for securing the ends of the support members after the fastener is applied. Because of the use of the bore and slot arrangement, when the assembly is thus placed in its desired mounting position the fastener can be inserted through the slot and bore into the vehicle body; previous to insertion of the fastener a boring instrument may be applied through the slot and bore to form a pilot hole for the fastener in the vehicle body, if desired.

BRIEF DESCRIPTION OF FIGURES

These and other objects and features of the invention will be more readily understood from a consideration of the following detailed description, taken in connection with the accompanying drawings, in which:

FIG. 1 is a side elevational view, partly in section, showing one form of vehicle-mirror mounting assembly embodying the invention, as applied to the mounting of a mirror upon one external contour of vehicle body;

FIG. 2 is a fragmentary elevational view, partly in section, showing the application of the structure of FIG. 1 to a different external vehicle contour;

FIG. 3 is an enlarged fragmentary view, partly in section, illustrating various possible relative positions of the articulating means and adapter means of the invention;

FIG. 4 is an exploded perspective view of the form of mounting means utilized in the embodiments of FIGS. 1-3;

FIG. 5 is an elevational fragmentary view illustrating a variation of the structures shown in FIGS. 1 and 2 in that the mirror-support assembly includes a self-locking hinge-joint; and FIG. 6 illustrates an alternative form of embodiment of the mounting means of the invention.

DETAILED DESCRIPTION OF SPECIFIC EMBODIMENTS

Referring now to the embodiments of the invention shown in the drawings by way of example only and referring first particularly to FIG. 1, the rear-view mirror 10 is mounted to the exterior of a vehicle, for example the left front-door panel 12 of a truck or automobile, by support means comprising: a ball-joint support 14 secured to an upper support arm 16 which may be of tubular metal; a lower support arm 18, which may be a bent continuation of arm 16; articulating members 20 and 22 riveted to the ends of support arms 16 and 18 respectively; adapter means 24 and 26 mating respectively with articulating members 20 and 22; and respective fastening means 28 and 30 for securing the articulating members and the adapter members to the door panel 12.

The rivet assembly 40 for securing the articulating member 20 to the support arm 16 comprises a rivet 42 extending through the support arm 16, the flat washer 44, a hole 46 in a mounting flange 48 on the articulating member 20, a second flat washer 50 on the opposite side of the mounting flange, and a spring washer 52 on the lower side of flat washer 50. The rivet assembly 56 for securing the articulating member 22 to the lower support arm 18 may be identical with the rivet assembly 40. In this example, the rivet assembly is held together sufficiently tightly by the rivet that the support arm will not rotate, and the mirror support assembly is therefore fixed in extended position. However, as shown in FIG. 5, a self-locking hinge joint assembly such as 58 may be used in place of the upper rivet assembly, corresponding parts of FIG. 5 and FIG. 1 being represented by corresponding numerals. Thus, the assembly 58 may comprise a conventional arrangement of a standard self-locking hinge joint 60 secured between the end of the support arm 16 and the mounting flange 48 by the bolt 62 and the nut 64. This latter arrangement permits the support arms 16 and 18 to swing outwardly and lock in the extended position, and yet to be readily retracted when desired; since such self-locking hinge joint arrangements are well known in the art, they will not be described in detail herein. Where the connection between upper support arm 16 and flange 48 is by means of a self-locking hinge joint assembly, the lower support arm 18 may be connected to the corresponding flange 48a of articulating member 22 by a loosely riveted arrangement, or by another self-locking hinge joint assembly if desired, so that the entire support assembly may be moved freely between extended and retracted positions.

Referring particularly to FIG. 4, in a preferred form the adapter member 24 is a semi-cylindrical member, the flat side 64 of which is adapted to seat flush against the outer surface of the vehicle body. The opposite side thereof is provided with the cylindrical surface 66, and a pair of semi-cylindrical flanges 68,68 are provided at opposite ends of the cylindrical surface 66 to receive and axially position the articulating member 20. Adapter member 24 may be made of any of a variety of different materials such as metal, plastic or even wood, although in the preferred embodiment it is made of a plastic material having sufficient rigidity to maintain its form in use. A pair of bores 70 and 72 extend through member 24 transverse to its cylindrical axis so that they will also be substantially normal to the exterior of the area of panel 12 on which the member 24 is mounted.

Still referring particularly to FIG. 4, the articulating member 20 in this example comprises the above-described mounting flange 48 and mounting hole 46, and a lower mating portion 78 provided with a mating surface 80 which is cylindrical and has substantially the same radius as cylindrical surface 66 of the adapter member. Articulating member 20 is therefore adapted to fit against the adapter member 24 with surfaces 66 and 80 in mating engagement, and with the articulating member axially positioned by the end flanges 68 and 70 so that pair of slots 84 and 86 extending through the mating portion 78 of the articulating means are aligned with the outer ends of the bores 70 and 72 in the adapter member 24.

It will be seen that the articulating member 20 may be placed in a variety of angular positions about its cylindrical axis while still maintaining mating relation with the adapter member. FIG. 3, for example, shows the articulating member 20 in the middle of its range of angular mating positions and the opposite extremes of the range of adjustment are shown in broken line. In FIG. 3, the different angular positions AA', BB' and CC' of the adapter member 24 are assumed to be due to differences in the angles of the surfaces of the mounting areas of the vehicle body to which the adapter member is secured, although it will be understood that the difference in relative angular positions between the articulating member and the adapter member may be due in whole or in part to different angular positions of the mirror support assembly caused by different horizontal displacements of the two vehicle areas to which the two support arms are to be secured.

In providing the mirror mounting shown in FIG. 1, each of the components thereof may be manufactured in standard manner without special regard to the shape of the exterior of the vehicle to which the assembly is to be attached. The two adapter means 24 and 26 are then placed on the mounting areas of the vehicle body panel 12 so that the flat sides thereof are flush against the desired mounting areas, and the remainder of the complete assembly is then moved into position so that the cylindrical surfaces of the two articulating members 20 and 22 are in mating engagement with the corresponding cylindrical surfaces of the associated adapter members 24 and 26. A boring tool may then be applied through each of the slots 84 and 86 and through the corresponding bores 70 and 72 to provide a pair of corresponding pilot holes in the body panel 12, and the self-tapping screws 28 and 30 then inserted through the slots and bores and screwed into the pilot holes until the articulating members and the corresponding adapter members are tightly secured to each other and to the body panel 12 in the position shown in FIG. 1. It is noted that, even though the mounting areas on the body panel 12 are at different angles to the vertical and are also horizontally displaced from each other, nevertheless secure flush mounting is achieved, and with a very simple assembly procedure.

FIG. 2 illustrates the application of the same mirror support assembly as in FIG. 1 to a differently shaped door panel 12a, corresponding parts of the mirror support assembly being designated by corresponding numerals. In this example, the angles which the mounting areas make with the vertical are quite different from each other, but there is no substantial difference between their horizontal positions. The construction and method of assembly is the same as in FIG. 1, the articulating members, however, being positioned somewhat further counterclockwise with respect to the corresponding adapter members as will occur automatically during the above-described assembly procedure. The same secure flush mounting is achieved as in FIG. 1, and although in this case the entire mirror support assembly is positioned slightly further counterclockwise than FIG. 1, this does not adversely affect the mirror mounting since the mirror 10 can then be adjusted on its ball joint support 14 so as to be horizontal as in FIG. 1.

Accordingly, the mirror support assembly of the invention can be secured to a substantial variety of different exterior body contours differing with respect to the angles of their mounting surface with respect to the vertical and/or differing with respect to the horizontal displacements of the mounting areas, while nevertheless providing secure flush mounting.

In the embodiments illustrated in FIGS. 1 and 2, the cylindrical axis of the adapter member and of the articulating members are all shown as horizontal, but it will be understood that these axes may all be at other angles so long as they are substantially parallel to each other in a given installation.

Also, while in FIGS. 1 and 2 the cylindrical surface of the adapter member is shown as convex and that of the articulating member as concave, this may be reversed, as shown in FIG. 6. In a latter figure one side of adapter member 90 bears against the door panel 12, and the opposite cylindrical surface 92 is convex; the articulating member 94 is provided with a concave mating surface so that, over a substantial angular range of adjustment between it and the adapter member, the two cylindrical surfaces of the adapter member and the articulating member will remain in flush contact as desired. In othe respects, the mounting means shown in FIG. 6 may be like, and used similarly to, the mounting means shown in the other figures.

It will be understood that more, or less, than two support arms and support members may be used, and other support arm configurations, such as the West Coast or Junior West Coast support arm arrangements, may be employed in connection with the invention. Also, other types of fasteners may be used, including but not limited to plastic expansion nuts, riv-nuts, etc.

While the invention has been described with particular reference to specific embodiments thereof in the interest of complete definiteness, it will be understood that it may be embodied in a variety of forms diverse from those specifically shown and described, without departing from the spirit and scope of the invention as defined by the appended claims.

What is claimed is:

1. In a vehicle-mirror assembly comprising a mirror, support means comprising two support members for supporting said mirror on two different respective areas of a vehicle body, and two mounting means for securing said two support members to said two different respective areas of said vehicle body, the improvement wherein each of said mounting means comprises:

mounting adapter means one side of which is adapted to bear against the corresponding one of said two areas of said vehicle body and the opposite side of which is provided with a first cylindrical surface; an articulating member secured to a corresponding one of said support members and comprising a second cylindrical surface mating with said first cylindrical surface and having a common cylindrical axis therewith, whereby said articulating member is angularly adjustable to various angular positions of mating with respect to said mounting adapter means about said common axis; and fastening means for securing said mounting adapter means to said vehicle body in a desired mounting position on the corresponding one of said two areas and for securing said articulating member to said mounting adapter means in a selected angular position with respect thereto; said common axis in one of said two mounting means being parallel to that in the other of said two mounting means.

2. The assembly of claim 1, wherein said fastening means comprises a fastening member extending through said articulating member and said adapter means into said vehicle body.

3. The assembly of claim 2, wherein said fastening means comprises a self-tapping screw.

4. The assembly of claim 2, wherein said mounting adapter means is provided with a bore extending through said first cylindrical surface for receiving said fastening means, and said articulating member is provided with a slot extending through said second cylindrical surface at right angles to said common axis and in alignment with the outer end of said bore for receiving said fastening means.

5. The assembly of claim 4, wherein said bore extends substantially normal to the exterior surface of said vehicle body when said mounting adapter means is in position on said vehicle body.

6. The assembly of claim 2, wherein said mounting adapter means comprises flange means extending transversely to said common axis at each of the opposite ends of said first cylindrical surface for receiving and axially positioning said articulating member between them.

7. A method for the mounting to a vehicle body of a mirror-support assembly comprising two spaced-apart support members to be mounted on two corresponding spaced-apart areas of said vehicle body, comprising:
   placing on each of said areas an adapter member presenting an exposed cylindrical surface and having a bore therethrough extending substantially normal to the area of said vehicle body to which said adapter member is to be secured, the cylindrical axes of the two adapter members being parallel to each other;
   providing on each of said support members an articulating member having a cylindrical surface of substantially the same curvature as a corresponding one of said cylindrical surfaces of said adapter members, each of said support members having a slot therethrough extending substantially at right angles to the axis of the cylindrical surface thereof;
   positioning said mirror support assembly so that each of said cylindrical surfaces of said articulating members mates with a different one of said cylindrical surfaces of said adapter members and so that said slots are aligned with said bores; and
   while said mirror support assembly is so positioned, inserting a fastener through each of said slots and the corresponding aligned bore to secure each of said articulating members to the corresponding adapter member and vehicle-body area, with the cylindrical surfaces of said articulating member and of said adapter members in fixed angular mating positions.

8. The method of claim 7, comprising the step of applying a boring instrumentality to said vehicle body through each of said aligned pairs of slots and bores while said mirror support assembly is positioned to provide said mating of cylindrical surfaces and prior to said insertion of said fastener, thereby to provide a pilot hole for said fastener.

9. The method of claim 8, in which said inserting of said fastener comprises inserting a bolt into each of said pilot holes by way of said slots and bores.

10. The method of claim 9, in which said bolt is a self-tapping screw.

* * * * *